UNITED STATES PATENT OFFICE.

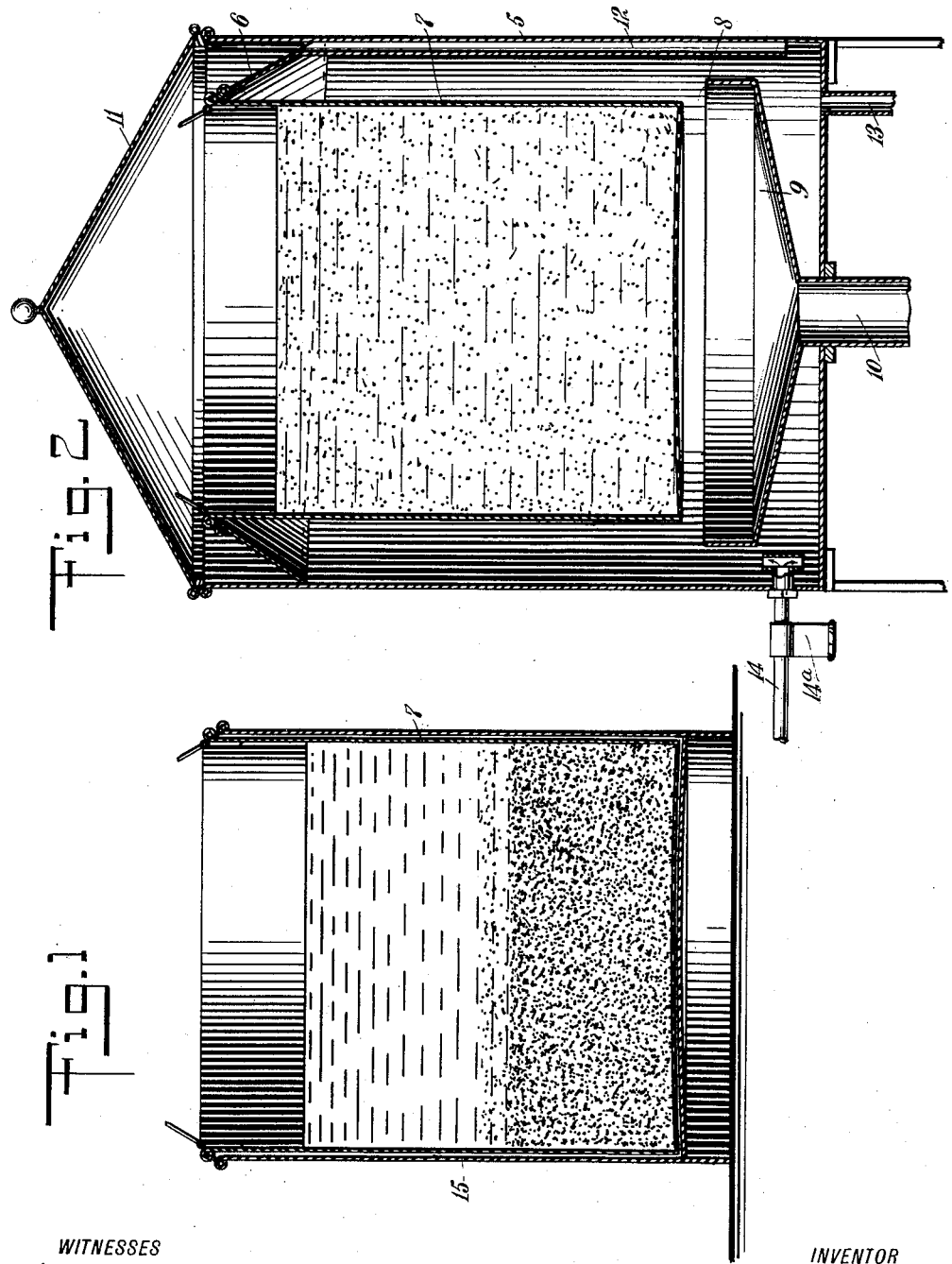

CHARLES MOSER ZIMMERMAN, OF CINCINNATI, OHIO.

GLUE-MELTING PROCESS.

1,009,616. Specification of Letters Patent. Patented Nov. 21, 1911.

Application filed October 29, 1909. Serial No. 525,351.

*To all whom it may concern:*

Be it known that I, CHARLES M. ZIMMERMAN, a citizen of the United States, and a resident of Cincinnati, in the county of Hamilton and State of Ohio, have invented a new and Improved Glue-Melting Process, of which the following is a full, clear, and exact description.

The invention is an improved process of melting glue, more especially when the glue is in large quantities.

In accordance with this invention the dry glue is poured into a converting vessel with a perforated bottom, and the vessel seated in a close-fitting soaking tank; water to the required amount is then added, which in due time will be absorbed by the glue, causing the latter to swell into a jelly form. The converting vessel with the soaked glue is then removed from the soaking tank and the vessel placed into the melting apparatus. When steam is turned on the glue will immediately melt and run out through the perforated bottom into a collector arranged below, from whence it passes to a receiver. In a short time the converting vessel is cleaned of all glue and is ready for further service.

Reference is to be had to the accompanying drawings forming a part of this specification, in which similar characters of reference indicate corresponding parts in both views.

Figure 1 is a central vertical section through the converter and soaking tank assembled; and Fig. 2 is a similar section through the melting apparatus, with the converter in place.

A steam vessel 5 is provided with an upwardly and inwardly inclined supporting wall 6, on the upper edge of which removably seats a glue converter 7, the converter having a perforated bottom 8, preferably slightly inwardly dished and forming in connection with the vessel 5 an annular heating chamber. Directly under the converter 7 is a collector 9 for the melted glue, arranged within the lower portion of the steam vessel and preferably funnel-shaped, the collector discharging through a central discharge pipe 10 leading to a suitable receiver or point of discharge. The steam vessel has a removable cover 11, shown to be of conical form, which, like the supporting wall 6, sheds the water to the sides of the vessel, where it is discharged to the bottom of the vessel through a drain pipe 12, and afterward, with such other water as is deposited in the lower portion of the tank, through a drain pipe 13. Steam is admitted to the lower portion of the vessel through a supply pipe 14 having a nipple at its discharge end provided with a contracted opening to reduce the volume of the flow, the supply pipe being further provided with a steam trap $14^a$ adjacent to the nipple, serving to strain the steam and prevent scales or dirt from choking the small hole in the nipple. I have found in practice that without reducing the volume of the steam as it enters the apparatus, the amount of moisture added to the glue jelly is so great and uncertain as to make it impossible to melt the glue with any degree of uniformity.

A soaking tank 15, shown in Fig. 1, is of a size and shape to closely fit the converter 7 and extend to its top, the bottom of the soaking tank operating to close the perforations in the bottom of the converter and prevent the passage of water therethrough; the closing of these perforations being better accomplished by reason of the slight dishing of the bottom of the converter, as described.

In operation, the converter is placed within the soaking tank, as shown in Fig. 1, and the glue put into the converter, and as much water afterward added as the glue can take up in passing into a jelly form. The vessel is then seated within the melting apparatus, as shown in Fig. 2, where the glue is rapidly melted and drips through the perforated bottom of the converter into the collector and then runs out through the discharge pipe; thus both the soaking and melting are performed without transferring the glue from one vessel to another.

Having thus described my invention, I claim as new and desire to secure by Letters Patent:

The herein-described process of melting glue, which consists in adding to the quantity of glue to be melted, as much water as the glue can take up in passing into jelly form, and after the glue has been thus converted into a jelly, melting the jelly by subjecting it directly to steam.

In testimony whereof I have signed my name to this specification in the presence of two subscribing witnesses.

CHAS. MOSER ZIMMERMAN.

Witnesses:
ARTHUR E. GEORGI,
MINNIE KLOTZBACH.